UNITED STATES PATENT OFFICE.

ISAAC WINSLOW, OF PHILADELPHIA, PENNSYLVANIA, ASSIGNOR TO JOHN W. JONES, OF PORTLAND, MAINE.

IMPROVED INDIAN CORN PRESERVED GREEN.

Specification forming part of Letters Patent No. 34,928, dated April 8, 1862.

*To all whom it may concern:*

Be it known that I, ISAAC WINSLOW, of Philadelphia, in the county of Philadelphia and State of Pennsylvania, have invented a new and useful Improvement in Preserved Indian Corn in the Green State; and I do hereby declare that the following is a full and exact description thereof.

In my first attempt to preserve Indian corn in the green state without drying the same I did not remove the kernels from the cob. The article thus obtained was very bulky, and when used the peculiar sweetness was lost, the same being absorbed, as I suppose, by the cob. After a great variety of experiments, I have overcome the difficulties of preserving Indian corn in the green state without drying the ssme, thus retaining the milk and other juices and the full flavor of fresh green corn until the latter is desired for use. Instead of a hard, insipid, or otherwise unpalatable article, I have finally succeeded in producing an entirely satisfactory article of manufacture, in which my invention consists.

I have employed several methods of treatment of the green corn with good results. My first success was obtained by the following process: The kernels, being removed from the cob, were immediately packed in cans and the latter hermetically sealed, so as to prevent the escape of the natural aroma of the corn or the evaporation of the milk or other juices of the same. Then I submitted the sealed cans and their contents to boiling or steam heat about four hours. In this way the milk and other juices of the corn are coagulated as far as may be by boiling, thus preventing the putrefaction of these more easily destructible constituents. At the same time the milk and other juices are neither diluted nor washed away, as would be more or less the case if the kernels were mixed with water and boiled. By this method of cooking green corn in the vapor of its juices, as it were, the ends of the sealed cans are bulged out, as though putrefaction and the escape of resultant gases had commenced within the cans. Consequently strong cans are required, and dealers are likely to be prejudiced against corn thus put up.

I recommend the following method: Select a superior quality of sweet corn in the green slate, and remove the kernels from the cob by means of a curved and gaged knife, or other suitable means. Then pack these kernels in cans and hermetically seal the latter, so as to prevent evaporation under heat, or the escape of the aroma of the corn. Now, expose these cans of corn to steam or boiling heat for about one hour and a half. Then puncture the cans and immediately seal the same while hot, and continue the heat for about two hours and a half longer. Afterward the cans may be slowly cooled in a room at the temperature of 70° to 100° Fahrenheit.

Indian corn thus packed and treated may be warranted to keep in any climate. Being preserved in its natural state as near as possible, it retains the peculiar sweetness and flavor of fresh corn right from the growing field. It is only necessary to heat this preserved corn and season the same, in order to prepare it for the table, as it is fully cooked in process of preserving.

Other modes of treatment may be adopted without departing from my invention so long as the hermetical sealing and the use of heat are so managed as to secure the aroma and fresh flavor and prevent putrefaction, thus producing the new article of manufacture, substantially as described.

Having thus fully described my invention, what I claim, and desire to secure by Letters Patent of the United States, is—

The above-described new article of manufactue—namely, Indian corn—when preserved in a green state without drying the same, the kernels being removed from the cob, hermetically sealed, and heated, substantially in the manner and for the purposes set forth.

ISAAC WINSLOW.

Witnesses:
WM. HINKLE,
WILLIAMS OGLE.